United States Patent
Kjaer

[11] Patent Number: 5,368,064
[45] Date of Patent: Nov. 29, 1994

[54] UNITIZED HYDRANT VALVE

[75] Inventor: Niels A. Kjaer, Laasby, Denmark

[73] Assignee: AVK-Holding, Galten, Denmark

[21] Appl. No.: 196,502

[22] Filed: Feb. 15, 1994

[51] Int. Cl.$^5$ .................................. F16L 7/00
[52] U.S. Cl. ....................... 137/375; 137/283; 251/356
[58] Field of Search ................. 137/283, 375; 251/356

[56] References Cited

U.S. PATENT DOCUMENTS

| | | |
|---|---|---|
| 1,352,735 | 9/1920 | Egerton . |
| 2,202,735 | 5/1940 | Johnson ........................ 137/375 |
| 2,469,109 | 5/1949 | Goecke ........................ 137/375 |
| 2,980,125 | 4/1961 | Grant et al. . |
| 3,310,277 | 3/1967 | Nielsen et al. . |
| 4,073,307 | 2/1978 | Royce . |
| 4,227,544 | 10/1980 | Luckenbill . |
| 4,303,223 | 12/1981 | Whisenhunt et al. . |
| 4,790,341 | 12/1988 | Laurel . |
| 4,842,246 | 6/1989 | Floren et al. . |

FOREIGN PATENT DOCUMENTS

| | | |
|---|---|---|
| 0092482 | 10/1983 | European Pat. Off. . |
| 1182016 | 6/1959 | France ........................ 137/375 |
| 1650558 | 9/1977 | Germany ........................ 137/375 |

Primary Examiner—A. Michael Chambers
Attorney, Agent, or Firm—Richard C. Litman

[57] ABSTRACT

A unitized, rubber coated valve body for a dry barrel fire hydrant. The valve body is formed to have a hollow, tapered, substantially spherical, cast iron member having a hollow center, a threaded, upwardly facing hole for attachment to a control shaft or stem, a downwardly facing projection, and a rubber coating. The unitized body eliminates labor of assembly during service and maintenance operations. The rubber coating both provides a resilient valve face for effective sealing, and protects metal parts of the valve from corrosion arising from contact with water. The tapered body both distributes force evenly to the rubber valve face in the manner of a prior art metal disc, and enables water to flow therearound with minimized resistance, thereby maintaining head pressure at acceptable levels. The novel valve body satisfies both objectives while minimizing weight and requiring minimal material for fabrication. The body is formed with integral ears for slidably obstructing drain holes.

6 Claims, 3 Drawing Sheets

UNITIZED HYDRANT VALVE

BACKGROUND OF THE INVENTION

1. FIELD OF THE INVENTION

The present invention relates to a valve disc assembly, or valve body, for a dry barrel fire hydrant.

2. DESCRIPTION OF THE PRIOR ART

Improvements to water valves generally and more specifically to those for fire hydrants has inspired numerous prior art patents. Two major developments over the years have included resilient valve faces, as provided by employing rubber, and drain holes which are obstructed and revealed by the valve member. The latter feature is an improvement to the dry barrel hydrant, which was developed to combat freeze damage to hydrants in northern climes. The following references are exemplary of the art.

U.S. Pat. Nos. 4,073,307, issued to John H. Royce on Feb. 14, 1978; 4,303,223, issued to Fred S. Whisenhunt on Dec 1, 1981; 4,790,341, issued to David F. Laurel on Dec. 13, 1981; and 4,842,246, issued to Carl E. Floren et al. on Jun. 27, 1989, each disclose a valve for a fire hydrant having a rubber valve face and also having ears which, when the valve is open for operation, block drain holes. Whisenhunt '223 is also illustrative of those designs providing walls surrounding the ears formed with a valve body, the walls constraining the valve body to move only axially when the stem is rotated, and against rotation responsive to this rotation. In each of these cases, the rubber valve seat is formed on a rubber disc sandwiched between upper and lower metal retaining members.

U.S. Pat. No. 1,352,735, issued to Henry C. Egerton on Sep. 14, 1920, discloses a valve having a metal disc entirely encased in a material such as rubber. Encasement in rubber protects metal parts from deterioration from contact with water.

U.S. Pat. No. 4,227,544, issued to Lawrence F. Luckenbill on Oct. 14, 1980, discusses head losses during high flow as a consequence of the configuration of the water passageway. The valve body is provided with frustoconical portions to assist in reducing turbulence and head pressure losses. U.S. standards for fire hydrants now include limits on head losses.

Rubber encasement of the valve body is seen, in combination with a valve body designed to be streamlined for reduced resistance to liquid flow, in U.S. Pat. No. 3,310,277, issued to Helmar T. Nielsen et al. on Mar. 21, 1967, and European Patent Office Application No. 0,092,482, dated Oct. 26, 1983.

The devices of Egerton '735, Nielsen et al '227, and EPO reference '482 are not directed to hydrant valves, and the respective valve bodies, when opening, move in the same direction as water flow, and are not hollow. This is in contrast to the practice of hydrant valves, wherein, at least in most recent designs, the valve opens against the direction of water flow.

A still more streamlined valve body is shown in U.S. Pat. No. 2,980,125, issued to Allen F. Grant et al. on Apr. 18, 1961. The streamlined body is made in mating halves, the valve being hollow and accessible, so as to house cooperating ears (elements 70) and legs (elements 75). This arrangement prevents the valve body from rotating, the valve body thus being constrained to move only axially, vertically, in response to rotation of the control shaft assembly operated by rotation of upper wrench lug (element 167).

None of the above inventions and patents, taken either singly or in combination, is seen to describe the instant invention as claimed.

SUMMARY OF THE INVENTION

The present invention discloses a valve disc or body for use with a dry barrel hydrant. The improvements thereto result in a single piece valve body, fully encased in rubber. The former characteristic reduces labor of assembly and disassembly required during periodic maintenance and service. The latter characteristic reduces service requirements by protecting metal parts from deleterious contact with water.

A particular combination of characteristics is set forth in the present invention which allows all the benefits to be realized, while rendering the final valve assembly as practical and economical as possible. It is desired to provide a single piece rigid base member which distributes force evenly against the rubber valve seat, thus assuring positive valve closure and minimizing stresses which would abrade or wrinkle the seat, and which defines a streamlined shape, thus causing efficient water flow patterns around the valve body when the valve is open.

To accomplish both objectives simultaneously requires a valve body which is essentially a tapered sphere, rather than a pure disc, which would distribute forces, but would not promote smooth water flow.

It then becomes important to limit the mass of the valve body, to reduce weight of both individual components of and the whole hydrant, which eases handling and servicing thereof, and to save cost.

The novel valve body satisfies these requirements by being constructed of a hollow, tapered, generally spherical or frustoconical, rigid member having a rubber coating. This valve body is operated by the conventional rotated stem or shaft, and is constrained against rotation by partially surrounding conventional ears to ride in tracks or grooves. The ears obstruct conventional drain holes when the valve is opened, and permit draining when the valve is closed.

Accordingly, it is a principal object of the invention to provide a hydrant valve disc assembly of unitary construction.

It is another object of the invention to provide a hydrant valve disc assembly having a single piece rigid base member.

It is a further object of the invention to provide a hydrant valve disc assembly which is encapsulated in rubber.

Still another object of the invention is to provide a hydrant valve disc assembly of minimal weight, and using minimal material.

Yet another object of the invention is to provide a hydrant valve disc assembly which reduces resistance to water flow therepast, and limits head losses at high rates of flow therethrough.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
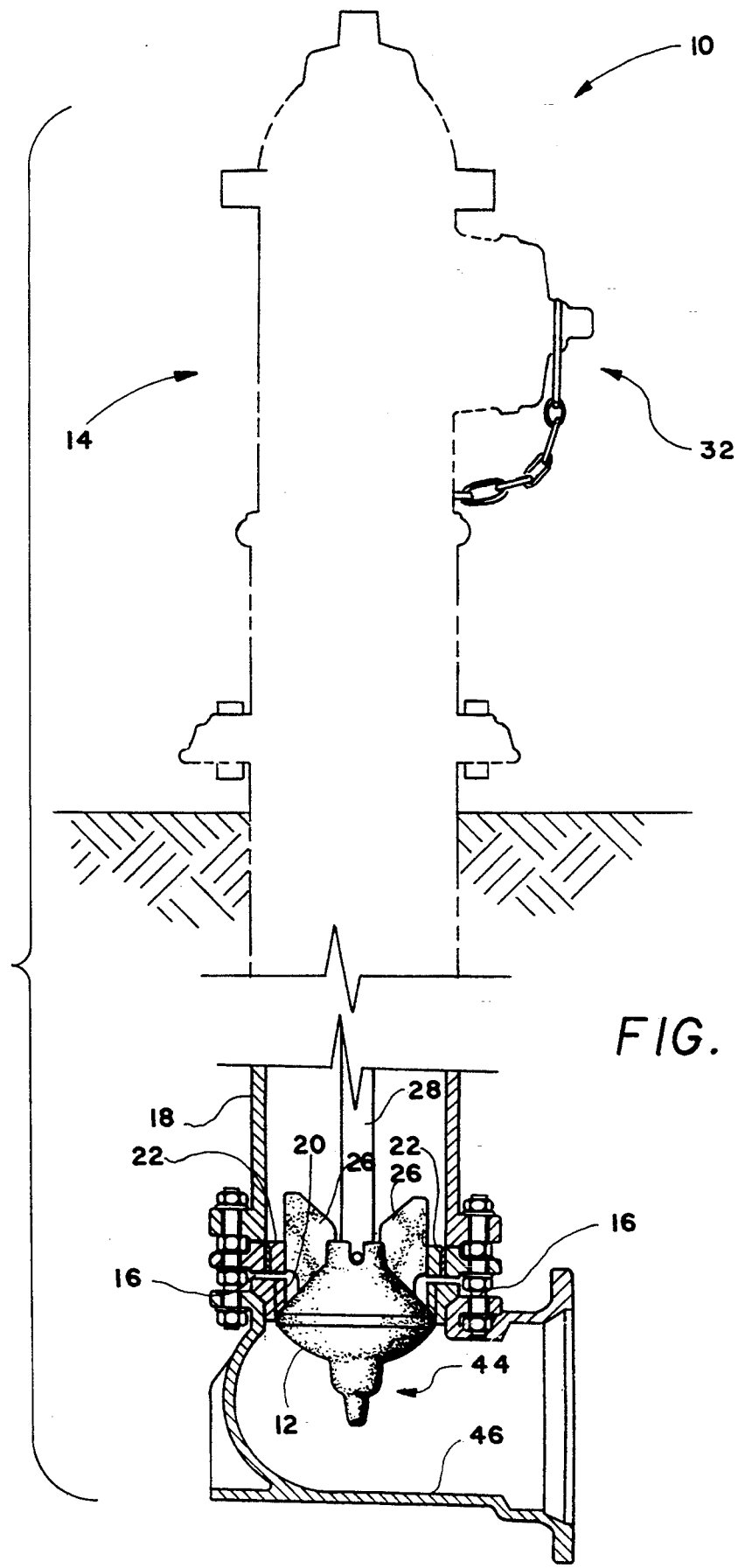
FIG. 1 is a partially diagrammatic, environmental, side elevational, partly cross sectional view of the invention.

The novel fire hydrant 10 and valve 12 therefor are shown in FIG. 1. Hydrant 10 is the dry barrel type, that being the type provided with a valve to drain water from the barrel when not in use. This avoids damage due to freezing of water, which could otherwise occur during periods of severe cold. Components 14 of hydrant 10 located above ground are of conventional construction, and accordingly are illustrated in silhouette only for clarity.

Conventional drain holes 16 are formed in the barrel 18 of hydrant 10, and are normally unobstructed. When hydrant 10 is in use, valve 12 unseats from a valve seat ring 20 which is not integral with, but is stationary with respect to, barrel 18. Valve seat ring 20 includes short walls 22 projecting inwardly, forming guide grooves 24 (see FIG. 3). Valve 12 includes two ears 26 which ride in respective guide grooves 24.

A control shaft 28, anchored within barrel 18 by well known structure (not shown), is arranged vertically, and threads into valve 12. When shaft 28 is rotated, valve 12 is constrained by guide grooves 24 against rotation, and must merely ascend and descend within barrel 18.

FIG. 1 shows valve 12 in the closed position. Rotation of shaft 28 would cause valve 12 to descend, thus separating valve 12 to unseat, and causing ears 26 to cover drain holes 16. Water from the water supply flows into barrel 18, and is prevented from escaping through drain holes 16. The entire supply is thus available to fire fighters, who will have uncapped nozzles 32, for attachment of fire hoses (not shown) thereto.

Figure 2:
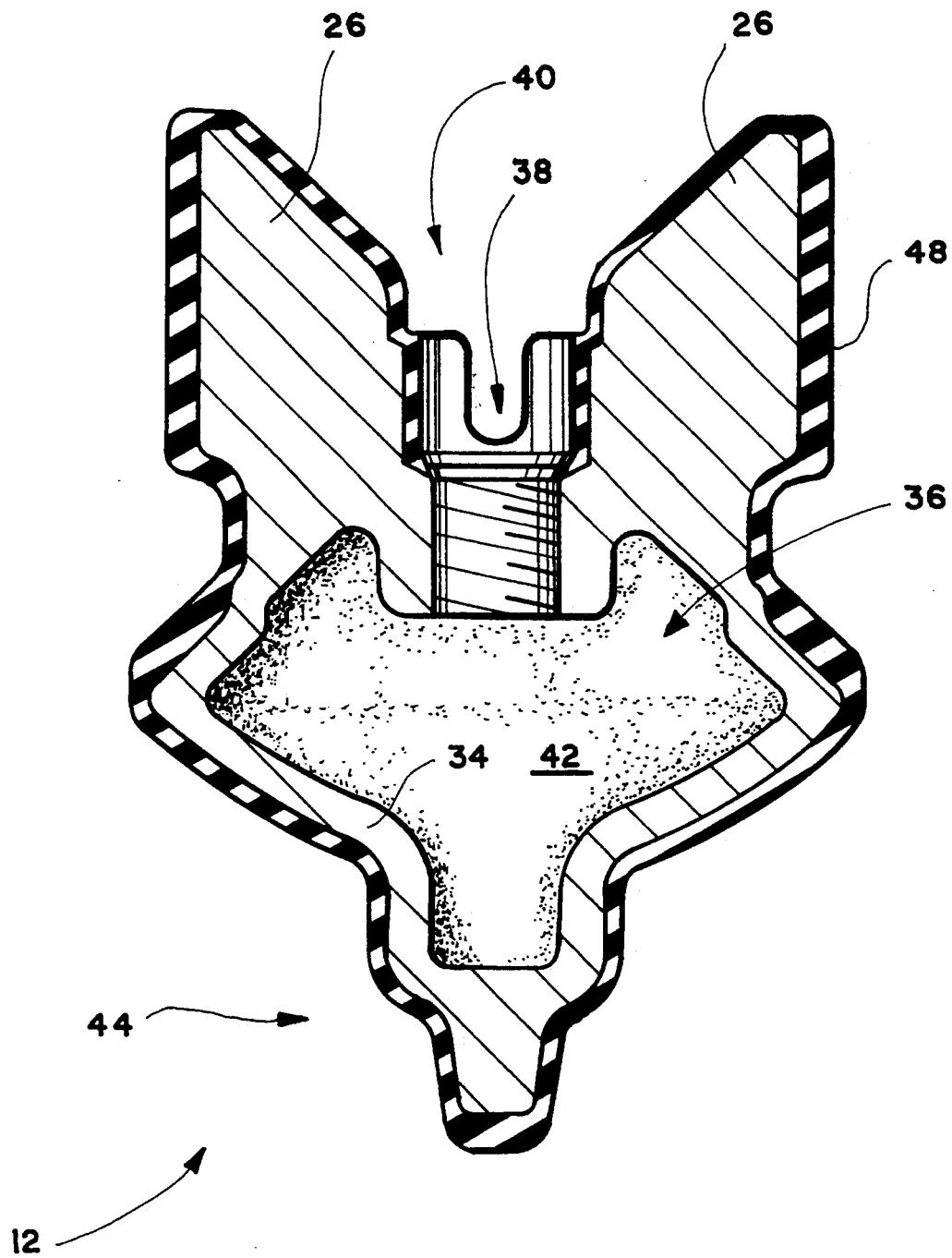
FIG. 2 is a partly cross sectional, partly side elevational detail view of the novel valve body, drawn to enlarged scale.

Construction of valve 12 is shown in detail in FIG. 2. The overall configuration of a base member 34 may be variously described as generally spherical or as comprising generally frustoconical members abutting so that the small ends thereof face away from one another. Regardless of the actual shape, sharp edges are avoided, and the diameter of base member 34 gradually increases, starting at the top and bottom, and proceeding toward the middle. These characteristics will be referred to as "tapered" hereinafter for brevity.

Base member 34 is preferably made in a single piece from cast iron, which is strong, durable over long periods of time, readily molded into a preferred configuration, and accepts threading. Base member 34 includes a hollow center 36, which is sealed when shaft 28 (see FIG. 1) is threaded into a threaded hole 38 which is formed in the top center 40 thereof. The unprotected interior surfaces 42 of base member 34 are therefore protected against corrosion by contact with water.

Figure 3:
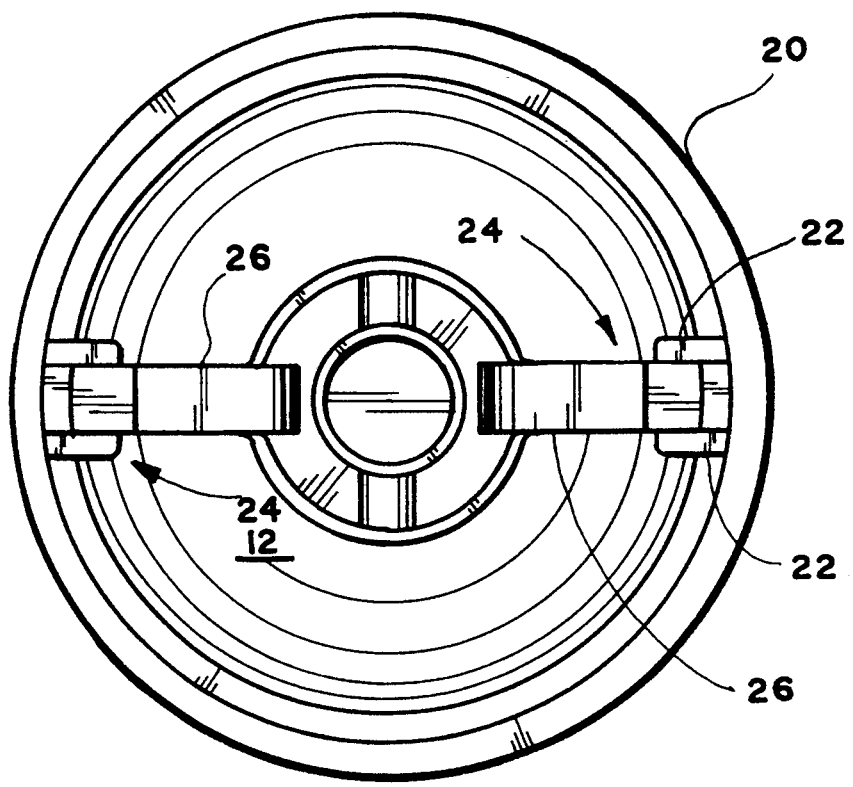
FIG. 3 is a top plan view of the novel valve body nested in the hydrant seat ring, drawn to enlarged scale.

Base member 34 includes ears 26 and a downwardly facing projection 44. Projection 44 is solid, in that unlike base member 34, it is not hollow. Ears 26 serve as valves closing drain holes 16 (see FIG. 1), and their relation to guide grooves 24 is best seen in FIG. 3. Again referring to FIG. 2, projection 44 limits downward travel of valve 12 by contact with the floor 46 (see FIG. 1) of hydrant 10. Base member 34 is covered by a thick coat 48 of rubber.

The novel valve and hydrant improved thereby thus enjoy reduced effort of handling during transport, construction, and servicing, while enjoying an extended service life and maintained head pressure during operation, all due to the combination of features presented herein.

It is to be understood that the present invention is not limited to the sole embodiment described above, but encompasses any and all embodiments within the scope of the following claims.

I claim:

1. A valve body for a dry barrel fire hydrant, comprising:
   a rigid single piece base member having a coating of resilient surface material, a top, a bottom, an empty cavity therein, and a threaded countersunk central opening in said top of said base member, the countersunk portion of said opening being surrounded by a resilient surface coating, whereby said empty cavity is closed from communication with water flowing therearound
   said base member further having a tapered configuration and at least one upwardly orientated ear extending from said top; and a solid, downwardly facing projection extending from said bottom of said base member.

2. A hydrant valve comprising:
   a tapered base member of unitary construction including a hollow center, a first end having a first center and a second end having a second center, said base member further includes a projection protruding from said first center at said first end, and a plurality of guide ears protruding from said second end;
   a threaded countersunk cavity formed at said second center, wherein said cavity is in contact with said hollow center; and
   a resilient coating covering the exterior of said base member including the countersunk portion of said cavity, whereby leakage of water into said hollow center is prevented.

3. The hydrant valve according to claim 2, wherein said plurality of guide ears includes a first ear and a second ear positioned on a side of said second end opposite to said first ear.

4. The hydrant valve according to claim 2, wherein said plurality of guide ears includes three ears protruding from said second end.

5. The hydrant valve according to claim 2, wherein said base member has a maximum circumference, and said guide ears do not extend beyond said maximum circumference.

6. A fire hydrant comprising:
   a barrel including means defining at least one drain hole therein, interior walls forming at least one guide groove therein, and a valve seat member having a valve seat; and
   a valve assembly including a control shaft secured within said barrel, and a valve body attached to said control shaft, said valve body movable selectively into and out of contact with said valve seat, said valve comprising a single piece base member made from a rigid material and defining an empty cavity therein, and having means defining an upwardly facing countersunk threaded hole, said base member having a tapered configuration and at least one upwardly orientated ear positioned around the upwardly facing hole and having an outward edge alignable with said at least one drain hole when said valve is opened, there being one said ear for each drain hole, said at least one ear being partially surrounded by said guide groove, ant constrained to travel vertically thereby, said base member further including an external coating of resilient material, said valve body further includes a downwardly facing projection and a resilient coating covering the exterior of said valve body including the countersunk portion of said hole.

* * * * *